(12) United States Patent
Drew

(10) Patent No.: US 6,200,220 B1
(45) Date of Patent: Mar. 13, 2001

(54) FLEXIBLE VANE COUPLING

(76) Inventor: Chester Drew, 388 Rte. 87, Columbia, CT (US) 06237

( * ) Notice: Subject to any disclaimer, the term of this patent is extended or adjusted under 35 U.S.C. 154(b) by 0 days.

(21) Appl. No.: 09/186,085

(22) Filed: Nov. 5, 1998

(51) Int. Cl.$^7$ .................................................. F16D 7/02
(52) U.S. Cl. ............................ 464/30; 464/55; 464/83; 192/56.61
(58) Field of Search ........................... 464/30, 41, 82, 464/45, 51, 55, 73, 81, 61, 83, 88, 77, 37; 192/46, 56.6, 56.61, 66.1

(56) References Cited

U.S. PATENT DOCUMENTS

| | | | |
|---|---|---|---|
| 1,333,131 | * 3/1920 | Pieper | 464/41 |
| 1,384,324 | * 7/1921 | Kelly | 464/41 |
| 2,563,112 | * 8/1951 | Hill et al. | 192/46 |
| 3,242,696 | 3/1966 | Kaplan . | |
| 3,405,929 | 10/1968 | Kaplan . | |
| 3,589,486 | * 6/1971 | Kelch | 192/46 |
| 3,712,438 | 1/1973 | Roddy et al. . | |
| 3,928,862 | * 12/1975 | Ivester et al. | 192/46 |
| 4,532,667 | * 8/1985 | Komesker et al. | 192/56.6 |
| 4,878,880 | 11/1989 | Williams . | |
| 5,037,354 | 8/1991 | Shaff et al. . | |
| 5,092,440 | 3/1992 | Nakano . | |
| 5,522,489 | * 6/1996 | Savkar et al. | 192/46 |
| 5,601,491 | * 2/1997 | Chan et al. | 464/37 |
| 5,707,291 | * 1/1998 | Fuller | 464/30 |

* cited by examiner

*Primary Examiner*—Lynne H. Browne
*Assistant Examiner*—Kenneth Thompson

(57) ABSTRACT

A slip coupling comprised of a hub with extending flexible vane(s). The vane(s) extend from the hub at an acute angle which allows them to flex when coming in contact with a relatively rotatable friction cylinder. The friction between the vane(s) and the friction cylinder creates resistance to movement. Relative motion between the hub and friction cylinder occurs only when the frictional force between them is overcome.

20 Claims, 9 Drawing Sheets

FLEXIBLE VANE COUPLING

FIELD OF THE INVENTION

This invention relates to a device which may be useful as a clutch or brake; more specifically, a slip friction clutch or brake with a minimal number of parts and long service life.

BACKGROUND OF PRIOR ART

Previous friction clutches consist of a multiplicity of small parts in order to achieve relatively high torque that is smooth in output. This creates a number of problems. Using a large number of parts increases manufacturing cost and inherent inaccuracies due to tolerance stack-up. The chances for parts not working together properly is also increased. Resulting problems can include inconsistent torque, backlash from poorly fitted parts; and with more parts, increased chances for failure. Also, it is time consuming and costly in terms of labor to assemble a clutch with a variety of small pieces. The present high cost of labor makes this type of clutch less desirable to produce now than in the past.

While a variety of inventions exist, many have involved complex designs that do not lend themselves to vary low-cost manufacturing and assembly procedures. For example, U.S. Pat. No. 3,712,438 is a clutch with radially expanding friction surfaces. Specifically, this is a centrifugally operated clutch. This type of clutch engage when rotational speeds increase sufficiently to force the inner friction surface into the outer surface.

Such clutch designs do not produce torque unless the inner member is rotating. Once a critical speed is reached, the inner expanding hub and driven member rotate in unison. As a result, this type of design is not made for slipping between members except for the brief period while engagement occurs.

Wrap spring type clutches are commonly used when slipping between friction surfaces is required. As the friction surfaces wear however, the spring must wrap down further to maintain constant torque. Torque output is very sensitive to wear due to the limited amount of radial movement of the wrap spring that is possible. Wear of 0.002–0.005 inches in the friction surfaces will cause the torque to drop off by a relatively large amount. This creates a significant limitation to clutch life. To reduce wear, expensive coatings or surface hardening of the friction surface must be done.

Furthermore, uneven radial forces result when the spring winds down onto the hub. This causes uneven wearing of friction surfaces. The full area of the friction element cannot be utilized to its optimum potential. Additional manufacturing complexities and costs are required to overcome this problem. U.S. Pat. No. 3,405,929 shows one attempt to reduce uneven wear of the friction surfaces. Wrap spring clutches typically have only one friction surface. With one friction element, torque can be increased only by increasing pressure between friction surfaces. Once maximum allowable surface pressure between friction surfaces has been reached, torque can be increased only by adding additional friction surfaces. U.S. Pat. No. 3,242,696 shows two friction surfaces. This increases the complexity of the design. With two concentric rings required to support friction surfaces, the chances for misalignment are greater.

Adding a second outer friction surface necessitates reducing the operating diameter of the first friction surface. Since torque is a function of force and distance from the center of rotation, reducing the diameter of the first friction surface reduces the torque it can produce. It also limits heat dissipation since heat is generated further away from the outer surface where it can be dissipated. Increasing the friction surfaces to three or more would compound the previously stated problem even more.

U.S. Pat. Nos. 5,037,354 and U.S. Pat. No. 5,092,440 are typical small clutches of simple design. Both designs require springs and additional supporting parts to urge the friction elements together. This increases cost and complexity. Both designs show only one friction surface. As described with wrap spring clutches, providing only one friction surface limits the maximum amount of torque which can be produced. Increasing the number of friction surfaces beyond the one shown increases cost and complexity still further. If it is even possible at all. The low torque output limits commercial applications since many and users require relatively high torque.

U.S. Pat. No. 4,878,880 shows a simple two-piece clutch. Both parts can be made as a molded plastic or metal part reducing costs further. There are at least two major shortcomings. First, the slipping elements jump from radial groove to groove as the clutch is rotated. This is described in column 5 lines 2 through 6 of U.S. Pat. No. 4,878,880. As a result, torque is not smooth. For current usage in business machines, for example; smooth torque is a prime concern. Second, torque is produced by cantilevered fingers extending axially from a plate. As the distance from the mounting plate increases, a cantilevered beam will have lower resistance to deflection. Therefore the outward radial force exerted along the length of the fingers is not consistent. Wear will be inconsistent since the part of the finger closest to the plate will not deflect as easily. By the very nature of the design, the full length of the friction elements cannot be fully utilized. As a result, clutch life and torque output will be reduced.

OBJECTS AND ADVANTAGES

It is among the objects and advantages of this invention to create a versatile clutch design which is fully functional with as few as two working parts.

Another object and advantage is the compensation for wear is friction surfaces which results in longer clutch life.

Yet another object and advantage is to have even wear of the friction surfaces throughout the life of the clutch.

Still another object and advantage of the invention is the simplicity in adding friction surfaces to increase torque output of the clutch.

Still another object and advantage of the present invention is to have smooth torque output as the friction elements slip against each other.

Additional objects and advantages include torque that can be different depending on whether the clutch is rotated in a clockwise or counterclockwise direction. Another additional object and advantage is the use of the device as a slip coupling where compliance between the two friction elements allows for concentric and angular misalignment between the two shafts that it connects.

Further objects and advantages of the present invention will be apparent from consideration of the drawings and ensuing description.

DESCRIPTION OF THE PREFERRED EMBODIMENT—FIGS. 1–3

Figure 1:
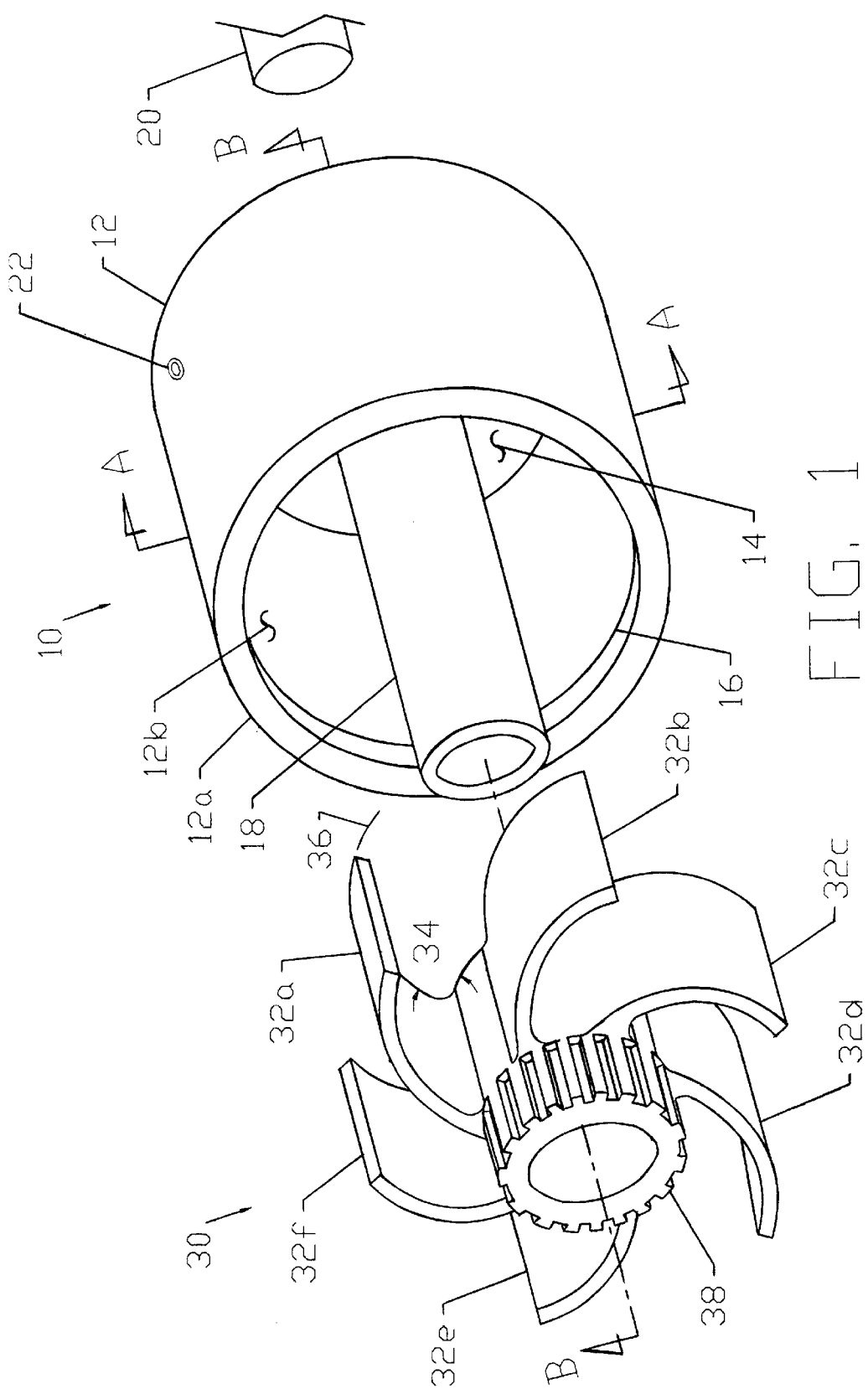
FIG. 1 is a perspective view of the basic construction and two components of the device before being assembled together.

A perspective view of a typical embodiment of the clutch is shown in FIG. 1. The device comprises a housing and shaft assembly 10. The housing assembly 10 consists of a cylindrical shell 12 with an outer diameter 12a and an inner diameter 12b. Also comprised in the housing and shaft assembly 10 is a rear surface 14, a shoulder 16, and a shaft 18. The housing assembly 10 is preferentially made from die cast zinc. All surfaces have smooth "as cast" finishes. The shaft 18 is formed onto the rear surface 14 and extends beyond the cylindrical shell 12. The shaft 18 is hollow to allow for mounting the clutch to an external drive shaft 20. Attaching the housing assembly 10 to the drive shaft 20 can be accomplished with a set screw 22, interference press fit, keyway, or spline.

The shaft 18 could also be made from a separate piece of material and mounted into the rear surface 14 of the housing and shaft assembly. In this case, the material could be carbon steel for additional strength.

The second part of the device consists of a hub 30. In preferred form, the hub 30 consists of a plurality of radially extending vanes 32a–f hereafter noted as simply vanes 32. The vanes 32 extend from the hub 30 at an acute angle 34 to the surface of the hub 30. In its free state, an outer diameter 36 of the vanes 32 is larger than an inner diameter of the cylindrical shell 12b. The hub 30 is made from a resilient plastic or rubber material which allows for flexing.

When the hub 30 is assembled into the housing assembly 10 the vanes 32 flex inward. This creates pressure and thereby frictional force between the two surfaces. As shown in FIG. 1, the vanes 32 are nested inside each other. This allows many friction surfaces to be placed radially around a small area. The bub 30 is retained inside the housing and shaft assembly 10 by means of the shoulder 16 at the edge of the inner surface of cylindrical shell 12b.

The outer surface of shaft 18 supports the hub 30 and acts as a bearing surface for hub 30 to spin on the hub 30 can be made to rotate relative to the housing assembly by many different methods. Shown in FIG. 1 is a timing-belt gear 38 which is molded as part of the hub 30.

Figure 2:
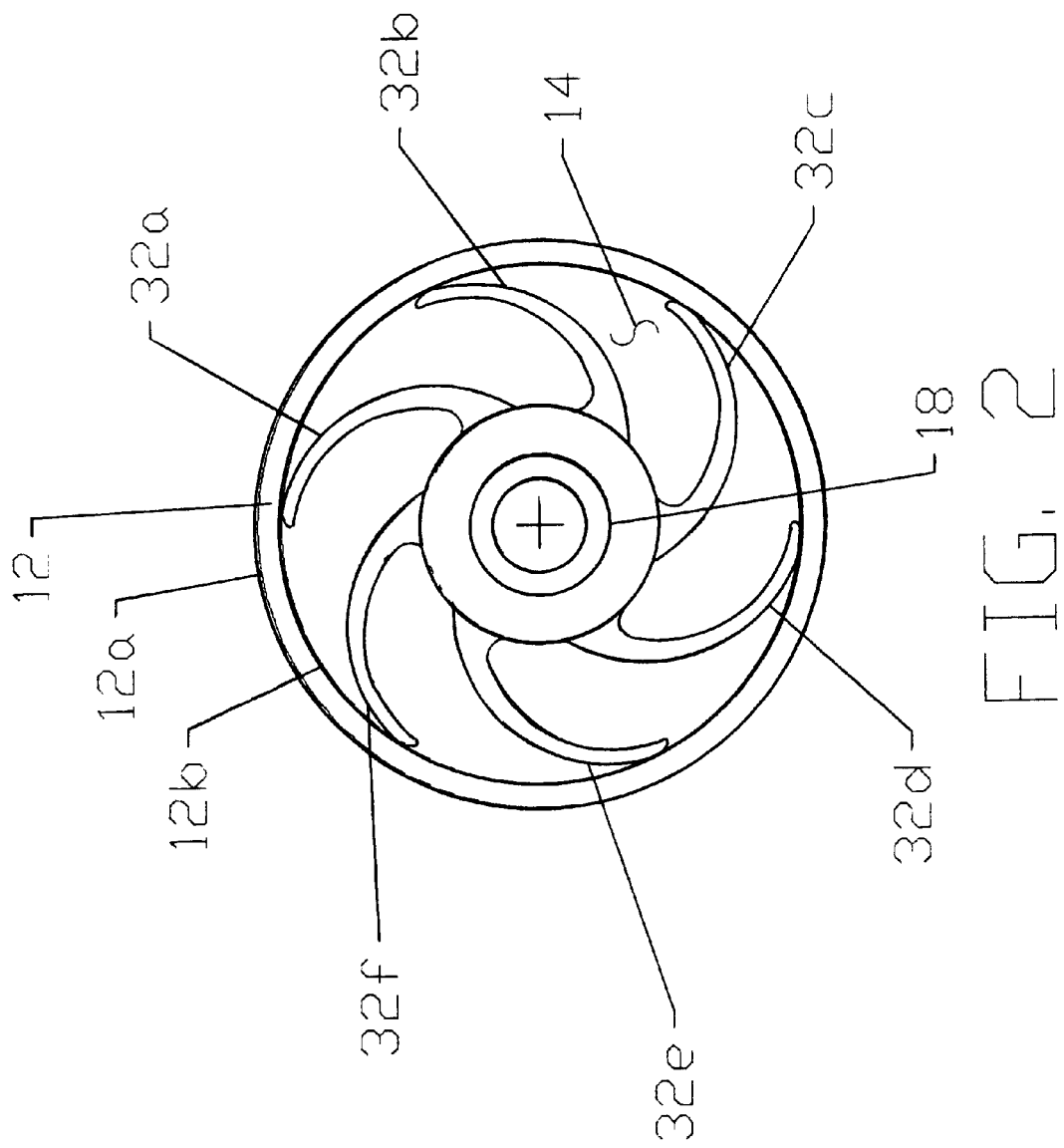
FIG. 2 is a section view of FIG. 1 taken through the middle of the device.

FIG. 2 shows the profile section A—A of FIG. 1. Here, the vanes 32 contact the inner surface 12b of the cylindrical shell 12. As shown, the tips of the vanes 32 do not contact the inner surface of the cylindrical shell 12. This creates a neutral surface interface whereby direction of rotation between the cylindrical shell 12 and vanes 32 has a minimal effect on torque.

Figure 3:
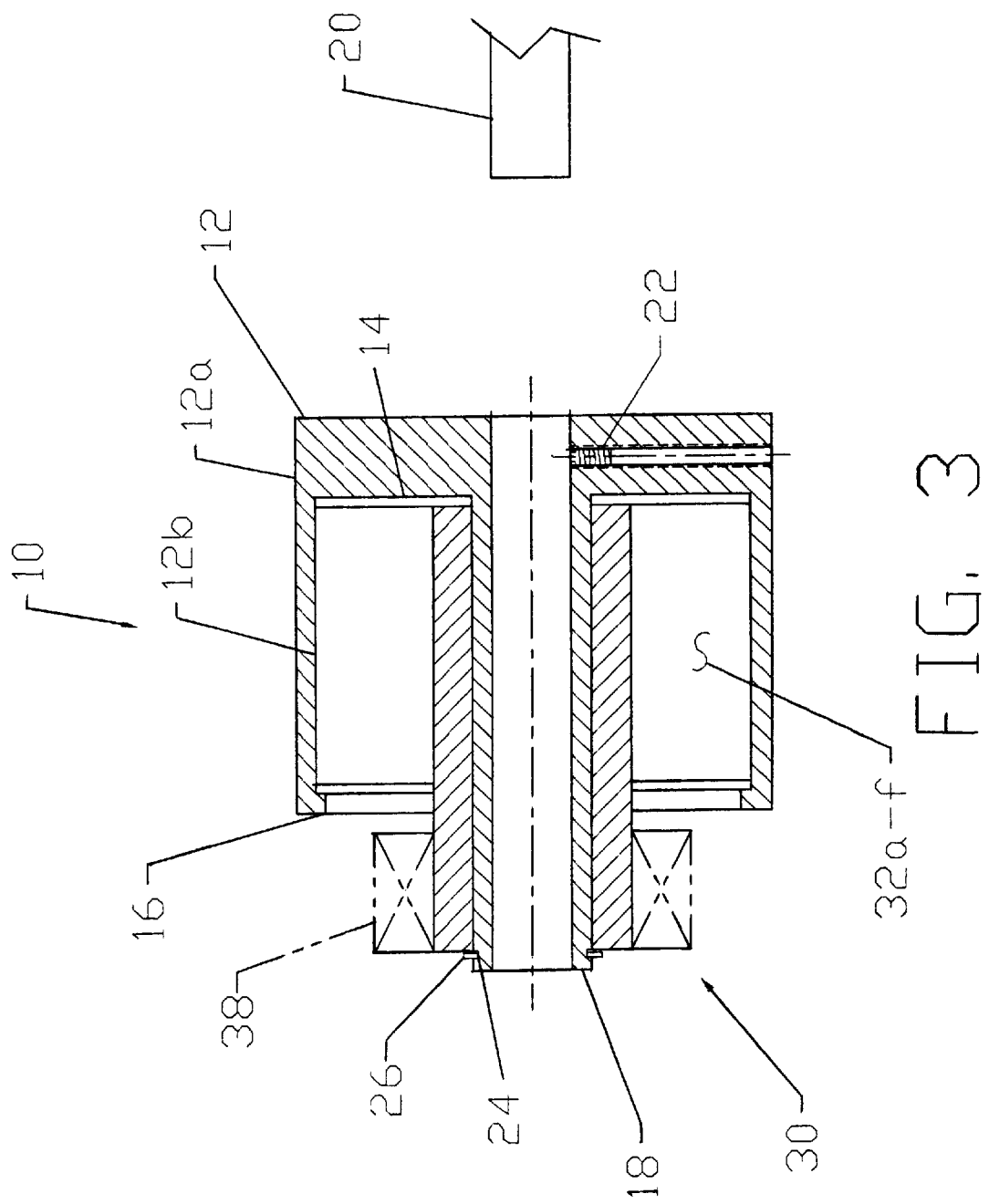
FIG. 3 is a section view taken along the length of the device shown in FIG. 1.

FIG. 3 shows the axial cross-section view B—B of FIG. 1. The hub 30 is retained inside the housing and shaft assembly 10 by means of the inwardly projecting lip 16 at the edge of the cylindrical shell 12. Alternately, a radial groove 24 could be cut into shaft 18. A snap ring 26 would fit into the groove 24 and retain the hub 30 into the housing assembly 10.

Also shown in FIG. 3 is a space for the timing belt gear 38. This can be molded as part of hub 30. Alternately, the gear or pulley 38 can be fabricated separately and pressed, bonded, or ultrasonically welded onto the hub 30. The set screw 22 is shown as an alternate way to affix the housing assembly 10 to the external drive shaft 20.

In operation, when gear 38 is driven, hub 30 is driven as well. The vanes 32 frictionally engage the inner surface 12b of the cylinder shell. The device of FIG. 1 is set for a predetermined torque in three ways. First is the pressure of contact of each vane 32 and cylindrical shell portion 12. Second is the number of vanes 32 used. Each vane contributes as equal amount of torque. This is the coefficient of friction between the vanes 32 and cylindrical shell 12. This is determined by the materials used.

Figure 4:
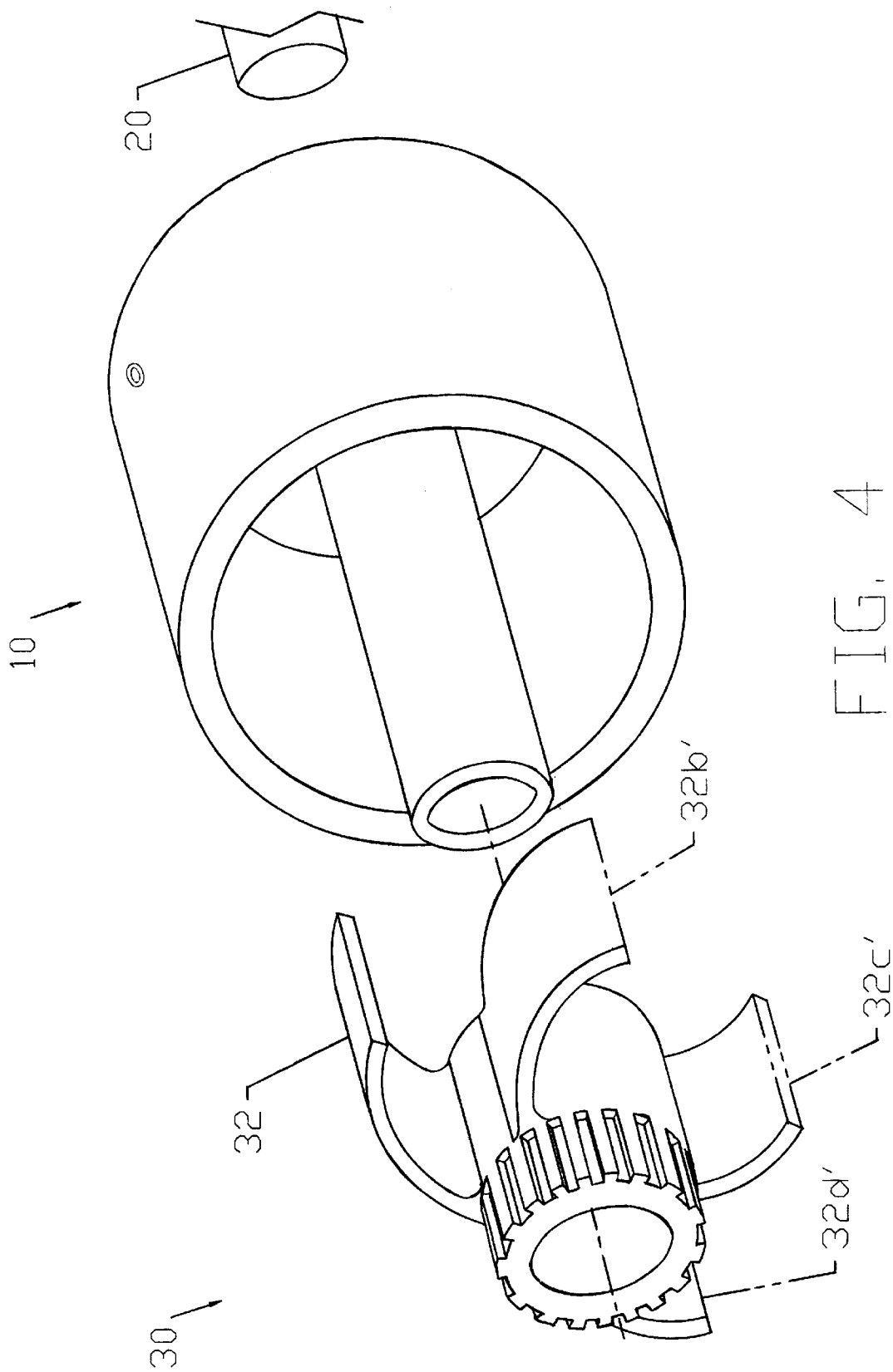
FIG. 4 is a perspective view of the device with fewer friction elements.

For example, FIG. 4 shows the invention of FIG. 1 but with only a single vane 32. One friction surface can be used for applications requiring very low torque levels. For vanes 32 or equal dimension, adding a second vane 32b' will double the torque. Adding a third vane 32c' will increase the torque three times that of a single vane and so on. In this way torque can be increased with only minor modifications to the basic design. As shows vanes 32c' and 32d' that are added do not have to be angled from the hub 30 in the same direction as vanes 32a' and 32b'.

Once the predetermined torque level is exceeded, hub 30 will rotate in relation to housing assembly 10. This could be a difference in rotational velocity of one member may be stopped altogether. As slipping occurs, material from housing material 10, they and vanes 32 will gradually wear away. Since the vanes 32 were initially flexed inward to fit into housing assembly 10, they will expand outward as material is worn away. For a ⅝" diameter clutch, the vanes are flexed about 0.015". Material wear after 1,000,000 revolutions is typically 0.0005". Since material wear is considerably less than flexure of the vanes 32, torque will not change substantially even though material is being worn away.

Even with slight variations is concentricity or angularity between housing assembly 10 and vanes 32, torque does not change. This is due to the self compensating effect of the flexing vanes 32. When one side of the housing assembly 10 is closer to the vanes 32 they are compressed more. The opposite side is further away so the vanes 32 flex by an equally reduced amount. Force vs. deflection of the vanes is fairly linear. The result is that higher torque from increased deflection on one side is compensated by equally reduced deflection, and torque, on the opposite side.

Figure 5:
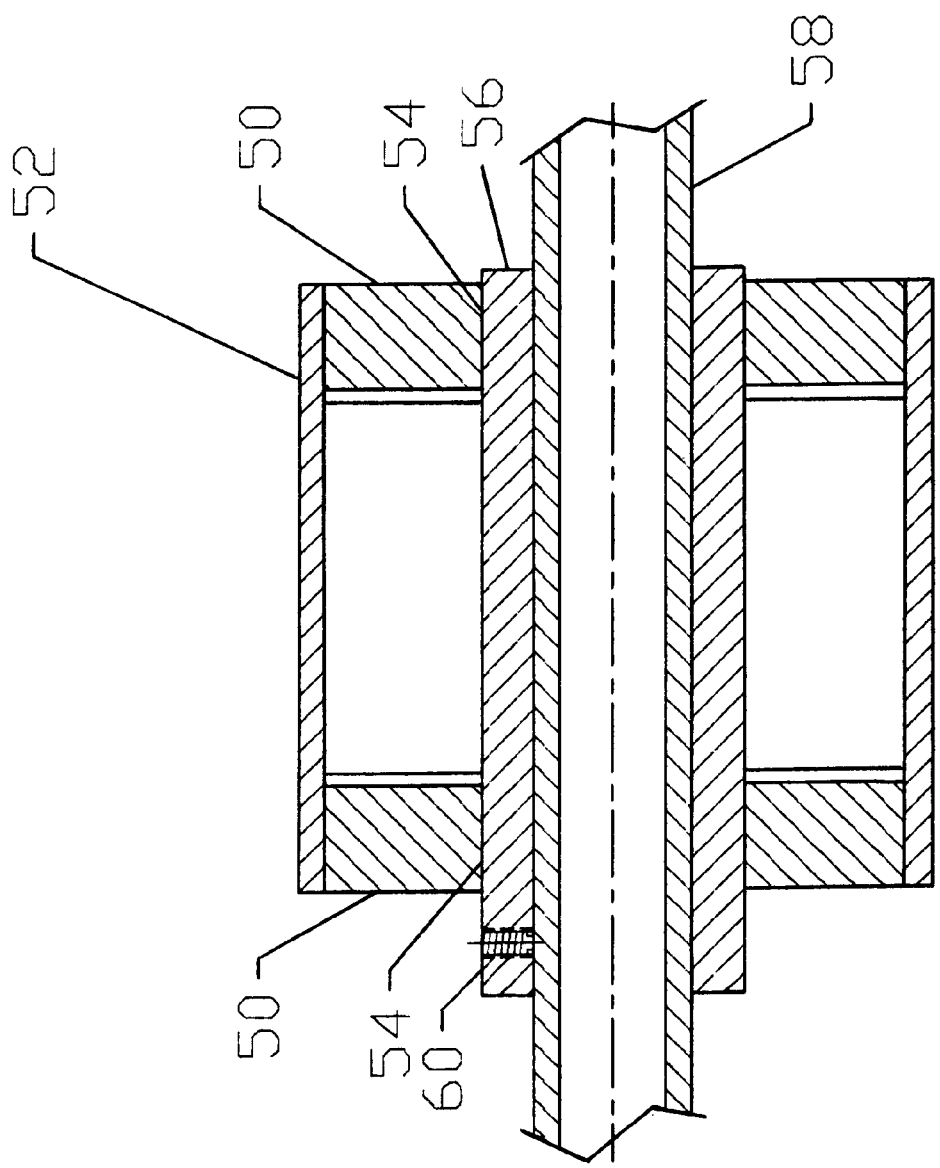
FIG. 5 is a section view along the length of the device illustrating a different arrangement of the elements.

FIG. 5 shows another way to mount the device. Here an end housing 50 is pressed into each end of a cylindrical shell 52. The inner surface 54 of each end housing 50 acts as a bearing surface for a hub 56 to rotate on. The cylindrical shell can be made from steel tubing. The end housings 50 are made from a suitable bearing material such as acetal plastic or oil impregnated sintered bronze. The hub 56 is of similar design to hub 30 as previously described. The hub 56 slides onto an external drive shaft 58 and is attached to the drive shaft 58 by means of a set screw 60, keyway, or a press-fit.

Figure 6:
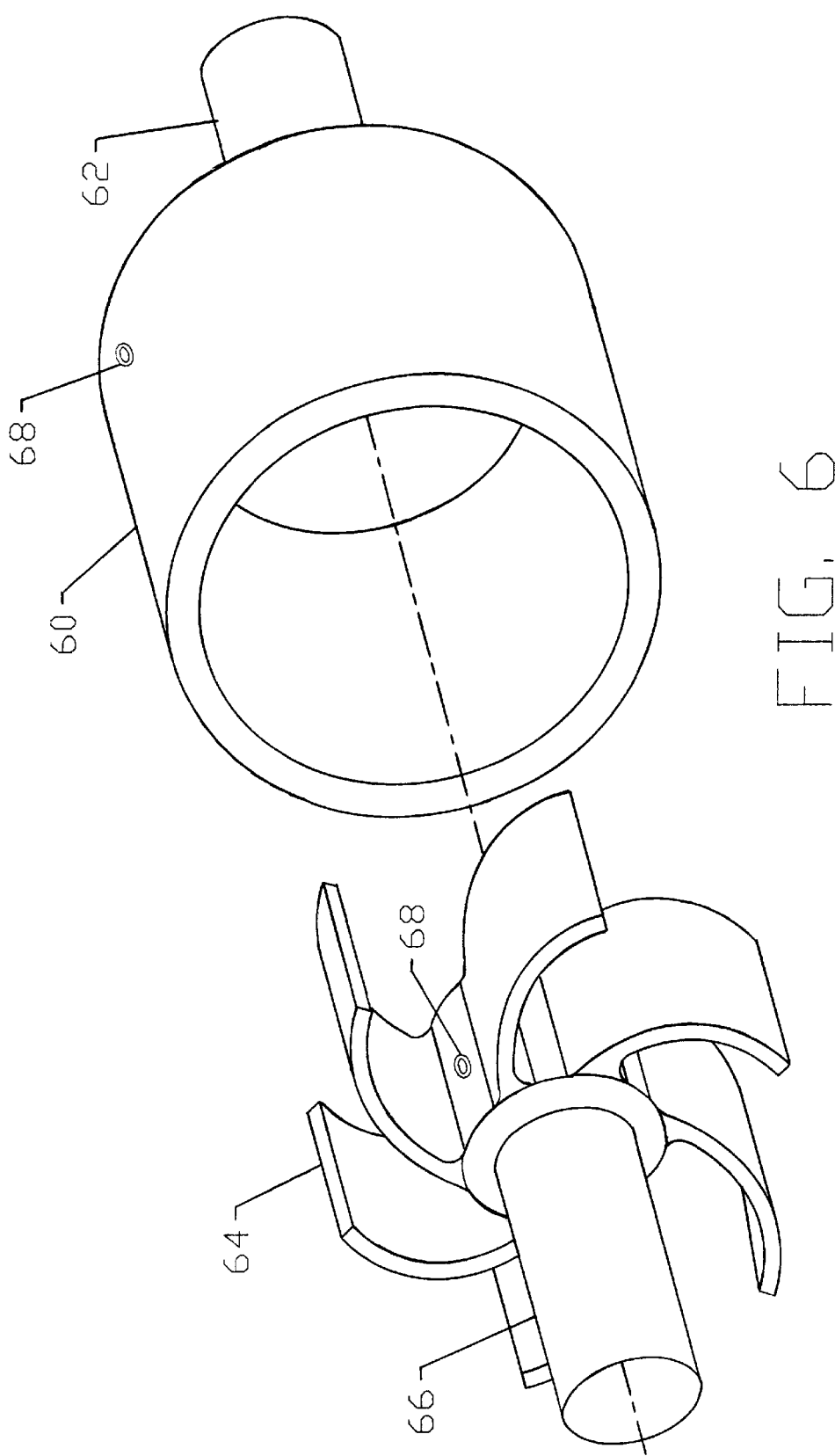
FIG. 6 shows the device attached to two separate shafts for use as a flexible slip coupling.

The device can be used as a flexible slip coupling between two shafts. This is shown in FIG. 6. Here an outer shell 60 is mounted to an external shaft 62. A mating hub 64 is mounted to a second shaft 66. The materials, construction, and operation are the same as previously described. Due to the flexing of the vanes, the two shafts can be slightly misaligned and torque will not be affected. Misalignment can be concentric, angular, or combination of the two. The two shell 60 and hub 64 are attached to their respective shafts by means of a set screw 68.

Figure 7:
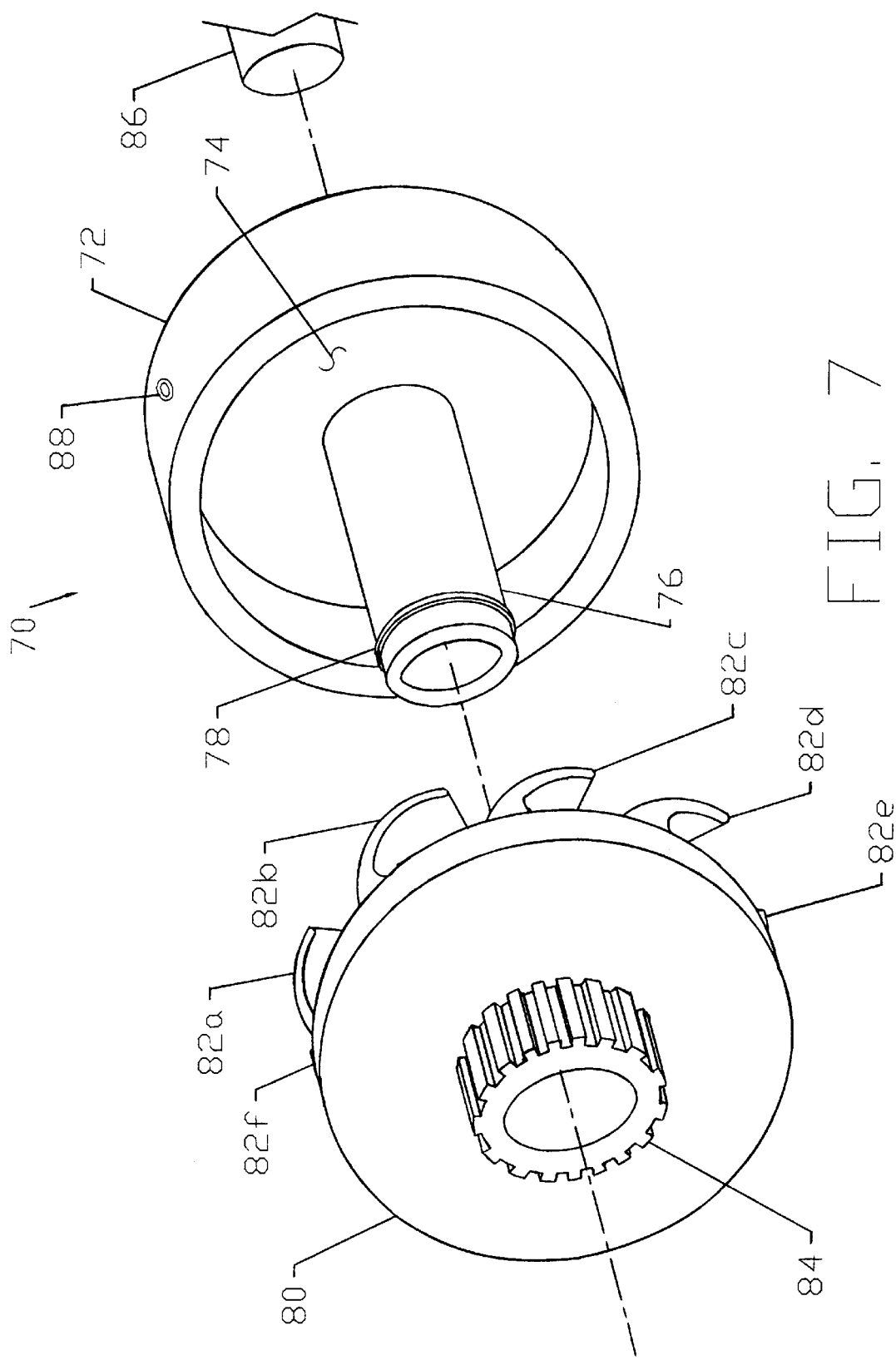
FIG. 7 shows the elements in an axial arrangement.

The housing and hub do not have to be oriented in a radial arrangement. FIG. 7 shows the elements oriented axially along a shaft. A housing and shaft assembly 70 supports a hub 80 as previously described. Comprised in the housing and shaft assembly 70 is an outer cylindrical shell 72, a rear surface 74, and a shaft 76. The shaft 76 is formed onto the rear surface 74 and extends beyond the cylindrical shell 72. The hub 80 is retained on the shaft 76 with a retaining ring 78. The shaft 76 is hollow to allow for mounting the clutch to an external drive shaft 86. Attaching the housing assembly 70 to the drive shaft 86 can be accomplished with a set screw 88, interference press fit, keyway, or spline.

The hub 80 consists of a plurality of axially extending vanes 82*a–f*. The vanes 82 extend from the hub 80 at an acute angle to the face of the hub 80. The hub 80 is made from a resilient plastic or rubber material which allows for flexing. When the hub 80 is assembled into the housing assembly 70 the vanes 82 flex inward. This creates pressure and thereby frictional force between the two surfaces.

The outer surface of shaft 76 supports the hub 80 and acts as a bearing surface for hub 80 to spin on. The hub 80 can be rotated relative to the housing assembly by many different methods. Shown in FIG. 7 is a timing belt gear 84 which is molded as part of the hub 80.

Torque can be different depending on direction of rotation. Here the surface 74 is serrated. The end of each vane 82 touches the inner serrated surface 74 of housing 70. When the hub 80 is rotated counterclockwise, for example; the tips of vanes 82 engage the housing 70 for direct lock up with no slipping possible between the housing 70 and hub 80. For rotation in a clockwise direction, slipping will occur once the limits of the frictional force is exceeded. This is because the acute angle of the vanes 82 allow the vanes to slide over the grooves versus engaging into them.

Figure 8:
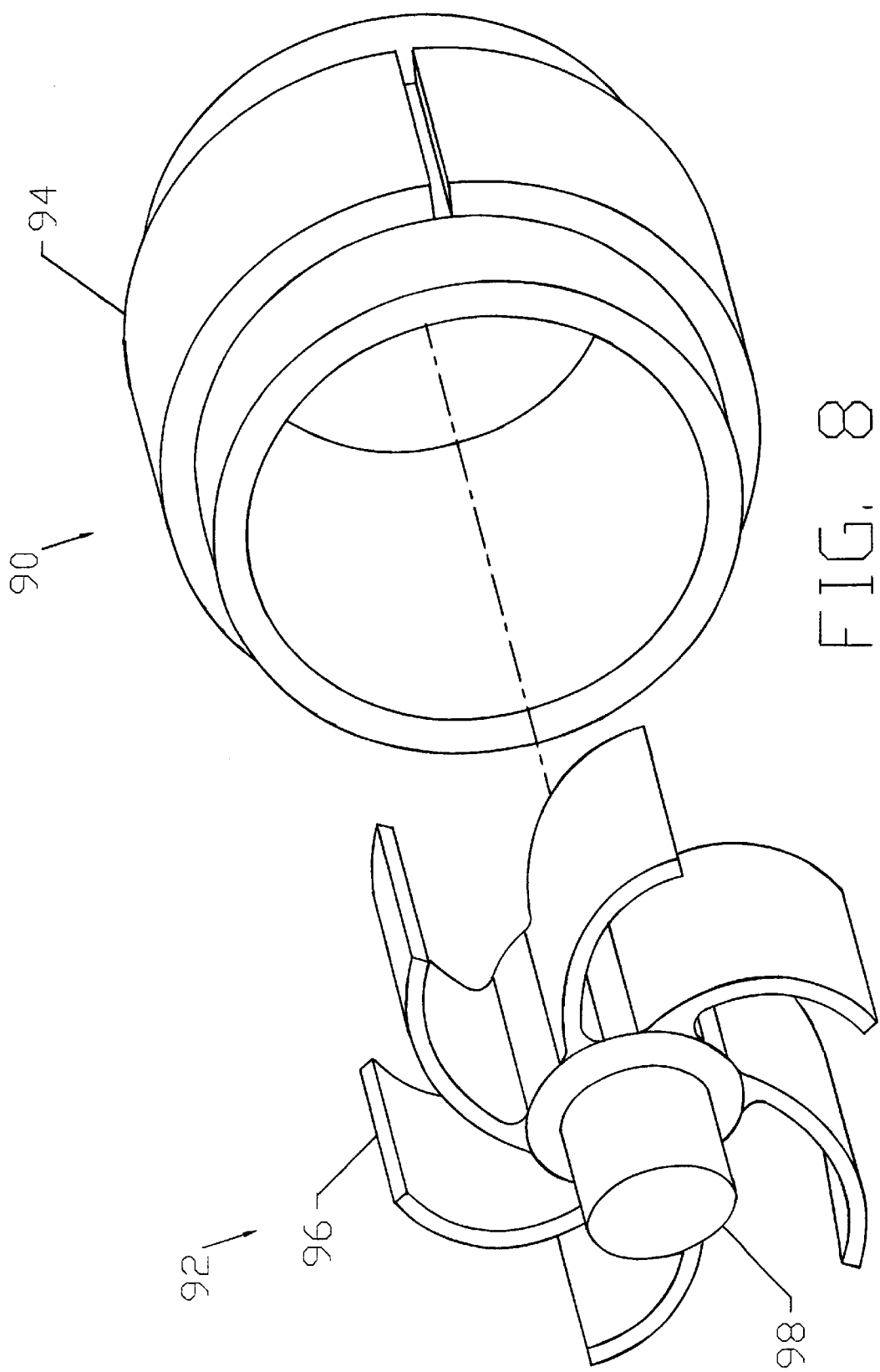
FIG. 8 shows the elements in a "free floating" arrangement where neither element is mounted in a fixed relation to the other.

As shown in FIG. 8, a housing 90 and a hub 92 do not have to be in fixed relation to each other. In this embodiment, a roller wheel 94 which winds and unwinds tape as in a videocassette recorder is mounted to the housing 90. The housing 90 stays generally concentric to hub 92 due to equal outward pressure by a plurality of vanes 96. As well as providing frictional resistance to rotation, the hub 92 allows for radial deflection of the roller wheel 94. Radial deflection can be used to compensate for sudden variation in tape speed. The torque limiting feature alone of the friction device would not compensate for such variations. The assembly is mounted via a cylindrical extension 98 of hub 92.

Figure 9:
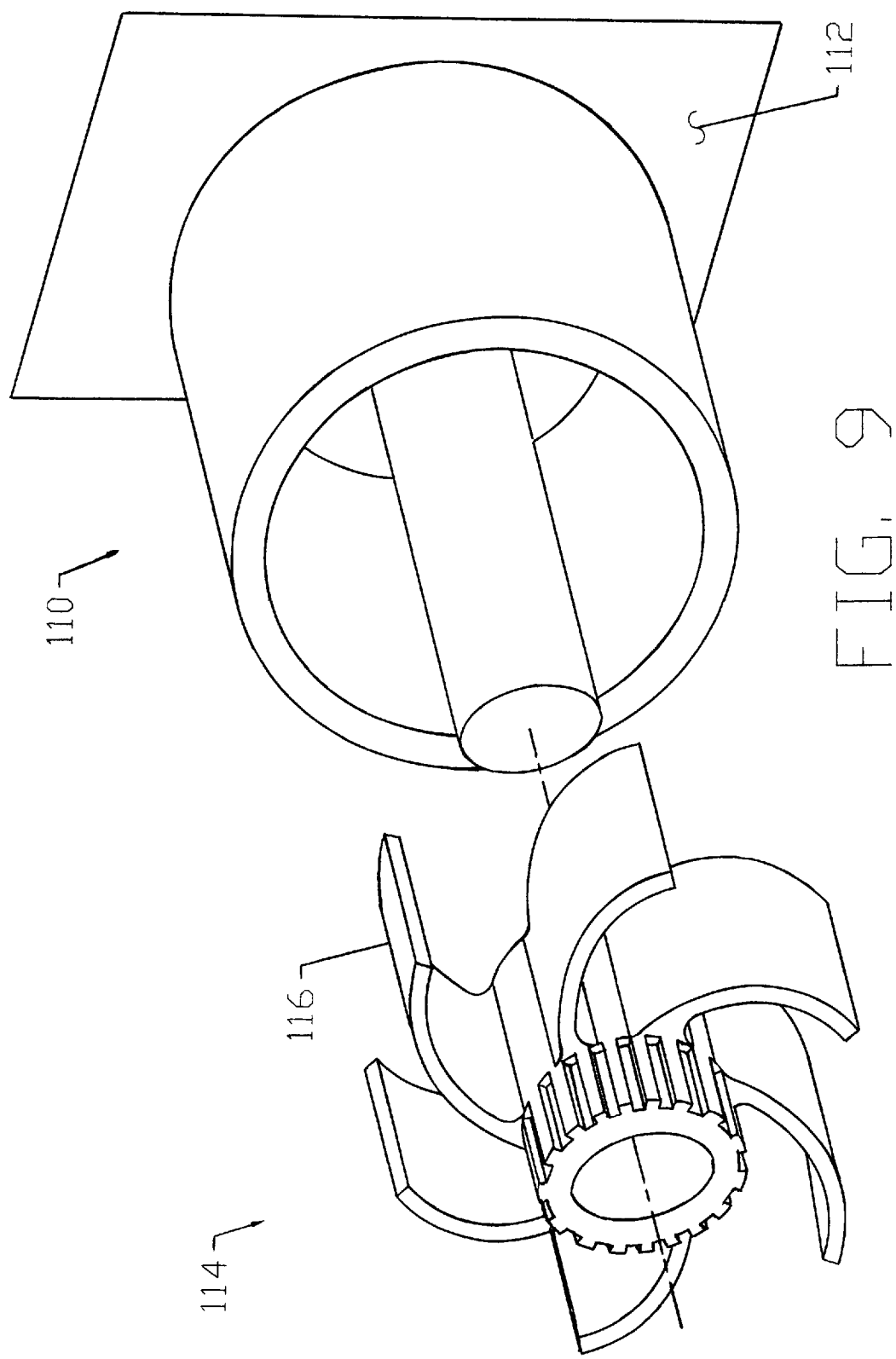
FIG. 9 is a perspective view showing the device used as a brake where one element is mounted to a fixed plate.

Operation of the device is not limited to use as a clutch. FIG. 9 shows the device used as a brake with a housing assembly 110 which is directly mounted to a stationary plate 112. A hub assembly 114 to which flexing vanes 116 are attached is free to rotate. This occurs once the friction force between the stationary housing assembly 110 and rotating hub 114 is exceeded. The outer dimensions of the housing 110 can be round, square, or any other shape most suitable for stationary mounting.

Thus the reader can se that this device provides improved torque and function over what has been previously available. Torque smoothness is minimally affected by variations in manufacturing tolerances. With only two basic components, assembly is greatly simplified. Automated assembly is a practical option with such a design. Flexural compliance of the friction elements compensates for dimensional variations so that torque loss is minimal as parts wear with use. Tailoring torque to particular applications is simplified by merely adjusting deflection or changing the number of friction vane elements.

While the invention has been shown and described with respect to a specific embodiment and modification thereof, this is intended for the purpose of illustration rather than limitation. Other variations and modifications will be apparent to those skilled in the art all within the intended spirit and scope of the invention. Accordingly, the patent is not to be limited in scope and effect to the specific forms herein shown and described nor in any other way that is inconsistent with the extent to which the progress in the art has been advanced by the invention. Therefore the scope of the flexible vane coupling should be determined by the appended claims and their legal equivalents, rather than by the examples given above.

What is claimed is:

1. A two piece slip clutch comprising:
    an inner rotary member having a hub with an outer diameter formed by at least one flexible member which is attached to said hub and extends radially outward from said hub at an acute angle;
    an outer member having a cylindrically shaped inner diameter smaller than said outer diameter of said flexible member such that said flexible member must flex inward when positioned inside of said outer member and when the outer member is subjected to an overload condition, said inner rotary member can rotate in relation to said outer member and wherein the flexible memeber engages the inner diameter of the outer member at a point spaced from the end of the flexible member so that as the flexible member wears it will expand outwardly and the torque will not change substantially.

2. The device as defined in claim 1 wherein said flexible member is made from a plastic material.

3. The device as defined in claim 1 wherein said flexible member is made from a rubber material.

4. The device as defined in claim 1 wherein said outer member is made from a cast metallic material.

5. The device as defined in claim 1 wherein said outer member is made from a plastic material.

6. The device as defined in claim 2 where there is a plurality of said flexible members.

7. The device as defined in claim 6 where said flexible members extend from said hub at different acute angles.

8. The device as defined in claim 1 wherein said inner rotary member is supported by and relatively rotatable with respect to said outer member by said flexible members extending from said hub at an acute angle from said hub.

9. The device as defined in claim 1 wherein said inner rotary member is located by a cylindrical shaft fixedly attached to and extending from a rear surface of said outer member.

10. The device as defined in claim 1 wherein said flexible member is of curved rectangular shape and which makes line contact with said cylindrically shaped inner diameter of said outer member.

11. The device as defined in claim 1 where a gear is attached to said inner rotary member.

12. A two piece slip clutch comprising:
    a rotary member having a flexible member which is attached to a hub and extends axially from said rotary member at an acute angle from said rotary member;

a second member positioned generally concentric and axially aligned with said rotary member such that said flexible member must flex when positioned against the face of said second member whereby when said rotary member is subjected to an overload condition, said rotary member can rotate relative to said second member and wherein the flexible memeber engages the inner diameter of the outer member at a point spaced from the end of the flexible member so that as the flexible member wears it will expand outwardly and the torque will not change substantially.

13. The device as defined in claim 12 wherein said flexible member is made from a plastic material.

14. The device as defined in claim 12 wherein said flexible member is made from a rubber material.

15. The device as defined in claim 12 wherein said second member is made from a cast metallic material.

16. The device as defined in claim 12 wherein said second member is made from a plastic material.

17. The device as defined in claim 12 where there is a plurality of said flexible members.

18. The device as defined in claim 12 wherein said rotary member is located by a cylindrical shaft fixedly attached to and extending from a rear surface of said second rotary member.

19. The device as defined in claim 12 where the face of said second member further comprises radially extending grooves which engage the outer tip of said flexible member whereby when said rotary member is subjected to an overload condition, said rotary member will rotate in relation to said second member in one direction but will not rotate relative to second member in the opposite direction.

20. The device as defined in claim 12 wherein said flexible member is of curved rectangular shape and which makes line contact with said second member.

* * * * *